(12) United States Patent
Gumpoltsberger et al.

(10) Patent No.: US 6,799,484 B2
(45) Date of Patent: Oct. 5, 2004

(54) ACTUATOR DEVICE FOR A SERVO-SHIFTED TRANSMISSION OF A VEHICLE

(75) Inventors: Gerhard Gumpoltsberger, Friedrichshafen (DE); Detlef Baasch, Friedrichshafen (DE); Ralf Dreibholz, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/205,671

(22) Filed: Jul. 25, 2002

(65) Prior Publication Data

US 2003/0019312 A1 Jan. 30, 2003

(30) Foreign Application Priority Data

Jul. 25, 2001 (DE) .......................... 101 36 232

(51) Int. Cl.$^7$ .................. F16H 59/00; F16H 61/00; F16H 63/00
(52) U.S. Cl. ............................... 74/335; 74/337.5
(58) Field of Search ............... 74/337.5, 335, 74/340, 336 B

(56) References Cited

U.S. PATENT DOCUMENTS

| 3,659,479 | A | * | 5/1972 | Kiss ........................... 475/218 |
| 3,688,596 | A | * | 9/1972 | Szodfridt et al. .......... 74/337.5 |
| 4,656,882 | A | * | 4/1987 | Kerr .......................... 74/337.5 |
| 4,782,714 | A | * | 11/1988 | Schletzbaum et al. ........ 74/360 |
| 5,735,176 | A | | 4/1998 | Winkam et al. ........... 74/337.5 |
| 5,865,062 | A | * | 2/1999 | Lahat ...................... 74/473.12 |
| 6,439,362 | B2 | * | 8/2002 | Reik et al. ................. 192/3.56 |

FOREIGN PATENT DOCUMENTS

| DE | 195 16 651 A1 | 11/1996 | ........... B60K/20/02 |
| DE | 199 24 335 A1 | 12/2000 | ........... F16H/63/16 |

* cited by examiner

Primary Examiner—Tisha Lewis
(74) Attorney, Agent, or Firm—Davis & Bujold, P.L.L.C.

(57) ABSTRACT

An actuating apparatus (1) for an automated multiple-ratio transmission (2) of a motor vehicle, having a shifter drum (3), actuatable by an actuating drive (5), that comprises at least one guide (9, 10) in which at least one guide element (6, 7), joined to an actuating member of the multiple-ratio transmission (2), is guided; and having at least one further separate shifter drum (4). The shifter drums (3, 4) are kinematically coupled to one another.

20 Claims, 1 Drawing Sheet

ACTUATOR DEVICE FOR A SERVO-SHIFTED TRANSMISSION OF A VEHICLE

FIELD OF THE INVENTION

The invention concerns an actuating apparatus for an automatic multiple-ratio transmission of a motor vehicle. The term "multiple-ratio transmission" is understood hereinafter to mean both automated gear-shifting transmissions, for example non-on-load-shiftable automated manual gear-shifting transmissions, and automatically on-load-shiftable double-clutch transmissions.

BACKGROUND OF THE INVENTION

Actuating apparatuses having shifter drums have already been used for some time in the field of motorcycles, since a particularly favorable coupling between a force actuation system and an implemented shifting logic is provided here by means of shifter drums. For engaging and disengaging ratios of the transmission, it is usual to use a shifter drum that has a circumferential track in which an axially displaceable guide element is guided, and that can have a defined rotary motion imparted to it by way of a foot lever with an associated pawl device.

Known shifter drums that have guides—usually in the form of grooves with pins, which sit on the corresponding selector rods or shift forks of the transmission and move them, running in them—are usually used in practice where simple actuation upon shifting is desired, e.g. in the context of a motorcycle, where only sequential shifting into the next gear is performed.

Since there are limited possibilities for implementing a logic for shifting ratios by the application of corresponding guides on the shifter drum and by transferring shifting force from an energy source to the shifting point, actuating apparatuses having shifter drums have hitherto been utilized in four-wheeled vehicles principally in racing.

Since shifter drums have the advantage, as components of actuating apparatuses, that they can easily be electrically motor-driven, and require considerably less complexity as compared to hydraulic shifting apparatuses with their requisite hydraulic circuits, efforts have recently become apparent to transfer the principle of an actuating apparatus with a shifter drum in particular to passenger cars having an automatic gear-shifting transmission. A purely sequential shifting capability as in the case of a motorcycle cannot be imposed in the context of a car, however, because of the unavoidable driver convenience drawbacks that necessarily result therefrom. To allow shifter drum technology also be used in an automated gear-shifting transmission, appropriate modifications to the shifter drums must be made.

DE 195 16 651 A1 describes a gear-shifting transmission, in particular for motor vehicles, in which the individual gear ratios are selected sequentially by the rotation of a shifter drum. The shift forks of the gear-shifting transmission are guided on the shifter drum, thereby eliminating the selector rods. Decoupling of the shift forks from the positive control system of the shifter drum means that the constrained sequence for selection of the individual gears can be eliminated.

DE 199 24 335 A1 furthermore discloses an actuating apparatus for a multiple-ratio transmission of a motor vehicle which has a shifter drum with a circumferential track. Guided in the circumferential track are at least two axially displaceable guide elements, which are coupled to one another in such a way that a shifting prong in the circumferential track can be used, depending on the rotational position of the shifter drum, for axial movement of two actuating members. This shifter drum can be combined with at least one further shifter drum, the underlying idea being, by way of two shifter drums rotatable independently of one another, to perform at least some gear changes in the shortest possible time while skipping over one or more gears, even without decoupling the axial guidance; and moreover to perform a gear change with overlapping actuation of two shift clutches, any interruption in tractive force during the shifting operation being minimized. Achieving this solution requires, however, an extraordinarily high level of design complexity.

It is generally problematic with shifter drums to actuate transmissions having many ratios and transmissions requiring a great deal of shifting force, and especially a combination of the two, for example as exists in the case of split-range transmissions.

In order to convert the torque present at the shifter drum into a shifting force, two geometric variables are known to be important, namely the shifter drum diameter and the angle of the circumferential track or groove. Increasing the actuation force in terms of the applied torque would necessitate reducing the diameter of the shifter drum or the groove angle.

On the other hand, an increase in the shifter drum diameter is more desirable so that the entire logic (in the form of grooves) can be accommodated on its surface. For a transmission having more than five ratios, for example, at least four grooves are necessary if four shift forks (for four shift packets to be operated) are each to be guided in a groove. Negative factors associated with an enlargement of the shifter drums, however, include not only limited installation space but also increased pressure on the groove and (as described above) the greater force needed to move the shifter drum.

For modern automated multiple-ratio transmissions having more than five ratios it is therefore difficult to control only one shifter drum with an actuator, since the developed surface of that one shifter drum usually no longer has sufficient space for optimum configuration of the guides.

It is the object of the present invention to create, for an automated multiple-ratio transmission of a motor vehicle having at least one shifter drum, an actuating apparatus with which the requirements in terms of guides on the shifter drum surface configured optimally for the shifting logic, minimal actuation force, and little installation space requirement can very largely be met.

This object is achieved, according to the present invention, with an actuating apparatus in accordance with the features of claim 1.

SUMMARY OF THE INVENTION

An actuating apparatus for an automated multiple-ratio transmission of a motor vehicle, having a first shifter drum and at least one further separate shifter drum that are kinematically coupled to one another, yields the advantage that the guides can be distributed onto at least two separate shifter drums, so that the shifter drums can be of correspondingly small dimensions and sufficient space is available for optimum configuration of the guides on the developed surface of the shifter drums. The term "multiple-ratio transmission" is understood here to mean both automated gear-shifting transmissions, for example non-on-load-shiftable automated manual transmissions, and automated on-load-shiftable multiple-ratio transmissions, for example double-clutch transmissions.

For example, the arrangement of two shifter drums coupled kinematically to one another can be used to associate one shifter drum with a principal transmission and the further shifter drum with a split-range transmission, so that a very large number of ratios can be shifted by means of two relatively small shifter drums.

The overall actuation force required is also greatly reduced. Corresponding to the lower energy required for transferring the shifting force, preferably only a single energy source is provided for driving the shifter drums; that energy source can be implemented by way of a manually actuated actuating drive or one equipped with electrical, pneumatic, or hydraulic devices.

The actuating drive can be connected to the shifter drums via a constant conversion ratio system, for example in the form of a belt drive or a tooth set; or by way of a non-constant conversion ratio system or non-constant conversion transmission.

Kinematic coupling between the shifter drums can also be implemented by way of a constant conversion or non-constant conversion transmission. Suitable as a constant conversion transmission is any kind of conversion device in which the conversion ratio is constant during one rotation of the shifter drums. A fixed conversion ratio of this kind can be, for example, a geared conversion system or, in the simplest case, a stationary shaft between the shifter drums, the conversion ratio then being 1:1.

A non-constant conversion transmission as kinematic coupling between the shifter drums can be any conversion ratio device in which the conversion ratio is variable, i.e. varies with the drum rotation, a defined conversion ratio being associated with each rotational angle or rotational angle range of the shifter drums.

What can be achieved with a variable kinematic coupling of this kind is that at first only a first shifter drum is adjusted, while the second shifter drum maintains its position for a certain period of time and is stationary. The conversion ratio of the kinematic coupling is then infinite for a defined period of time.

Kinematic coupling of the shifter drums with a non-constant conversion ratio is advantageous in particular in transmissions having six or more gears without a split-range structure, in which context a correspondingly configured stepped shifting mechanism, an entrainment apparatus, a cam transmission, or a belt drive with an eccentrically running wheel can serve as the non-constant conversion transmission.

BRIEF DESCRIPTION OF THE DRAWINGS

The invention will now be described, by way of example, with reference to the accompanying drawings.

Two exemplary embodiments of an actuating apparatus according to the present invention are depicted in the drawings and will be explained in more detail in the description below. In the drawings.

DETAILED DESCRIPTION OF THE INVENTION

Figure 1:
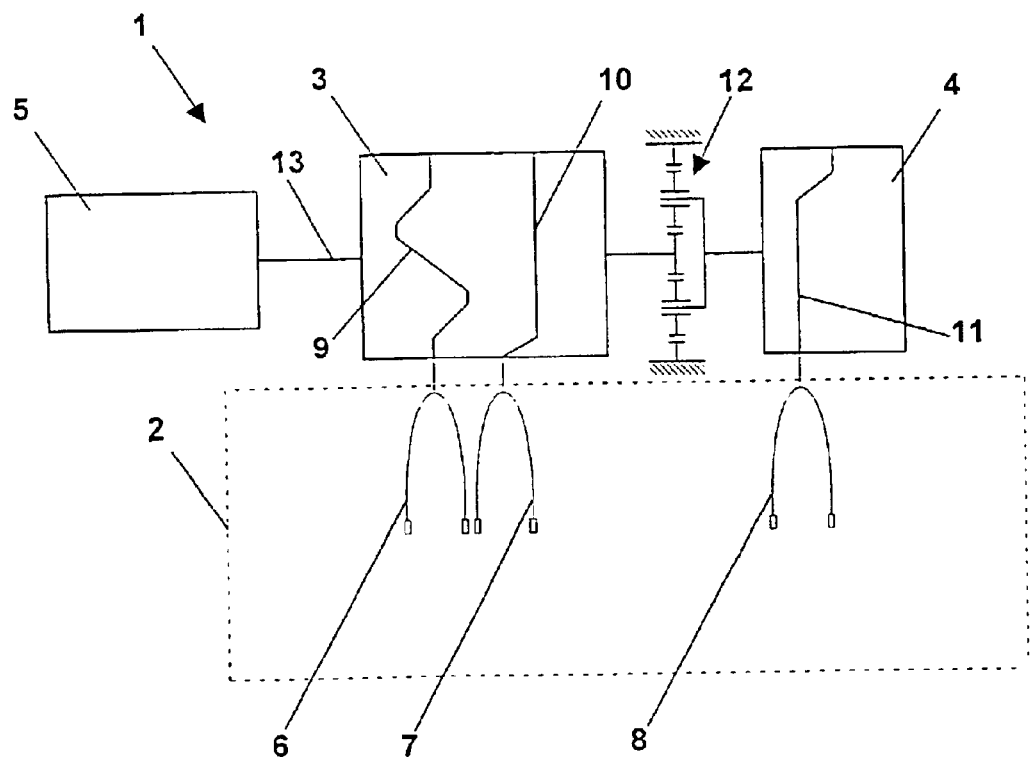
FIG. 1 schematically depicts an actuating apparatus according to the present invention for an automated 4×2 split-range transmission, having two shifter drums kinematically coupled to one another and a linear configuration as regards an actuating drive.

FIG. 1 depicts an actuating apparatus 1 according to the present invention for an automated 4×2 split-range transmission 2 (indicated only symbolically) of a motor vehicle. Actuating apparatus 1 comprises two shifter drums 3 and 4, both of which have an at least approximately cylindrical shape and are kinematically coupled to one another. Shifter drums 3 and 4 are driven by an actuating drive 5 which in the present case is embodied as an electric motor.

Gear-changing transmission 2 shown here is a multiple-group transmission which has a main transmission having four ratios and a range group with which the ratio sequence of the main transmission can be doubled to eight ratios. Shifter drums 3 and 4 are provided in such a way that shifter drum 3 is associated with the main transmission while shifter drum 4 serves to shift the range group. Shifting of the main transmission is accomplished via two shift forks 6, 7, and shifting of the range group via a shift fork 8. Shift forks 6, 7 and 8 are on the one hand coupled to a corresponding actuating member of gear-shifting transmission 2, and on the other hand are guided in an associated guide 9, 10 or 11 on shifter drum 3 or shifter drum 4.

Upon a rotation of shifter drums 3 and 4, shift forks 6, 7 and 8 representing the guide elements are axially displaced in guides 9, 10, 11, which in the present case are configured as groove-like circumferential tracks on the developed surface of shifter drums 3, 4, and thereby cause a displacement of the actuating members or shifting packets of gear-shifting transmission 2, which can be of conventional configuration in gear-shifting transmission 2 and therefore are not explained further here.

It is understood that in other embodiments, the guides on the shifter drum can also be differently shaped; they do not necessarily need to be configured in the manner of grooves, but in simple cases can also, for example, be similar to holes. In addition, multiple shift forks can optionally be guided in one circumferential track.

In the present case, kinematic coupling of shifter drums 3 and 4 is accomplished by way of a constant conversion ratio system 12. Since, in the 4×2 split-range transmission shown here, shifter drum 3 of the main transmission is intended to rotate four times as fast as shifter drum 4 of the range group or range transmission, conversion ratio system 12 is implemented here by way of a constant conversion planetary transmission of simple design having a conversion ratio i=4.

In the embodiment according to FIG. 1, actuating drive 5 that drives the two shifter drums 3, 4 in a linear arrangement is connected to first shifter drum 3 via a shaft 13 that creates a 1:1 conversion ratio.

Figure 2:
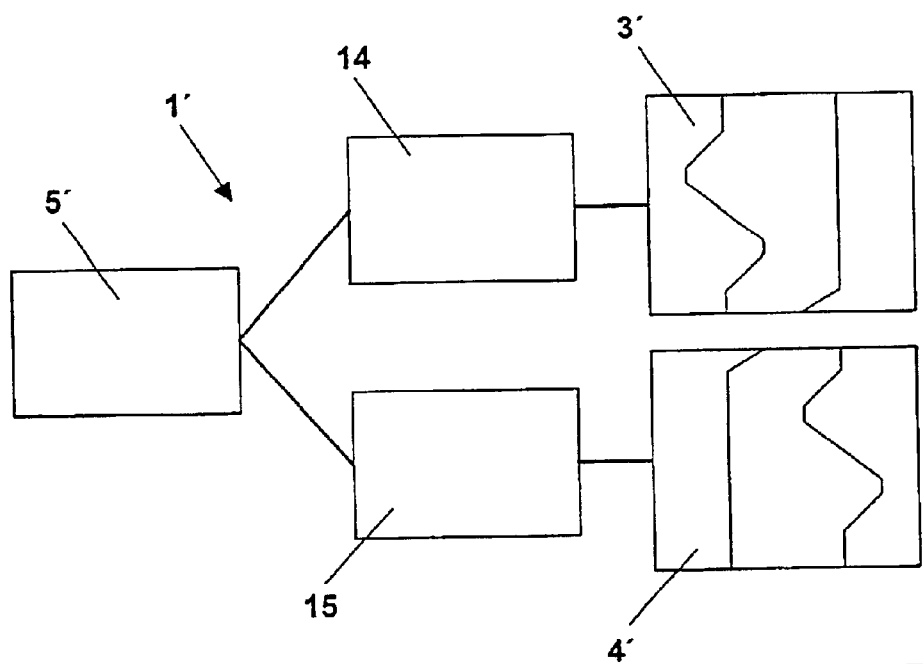
FIG. 2 schematically depicts an actuating apparatus according to the present invention that is simplified as compared to FIG. 1, having two shifter drums kinematically coupled to one another and a parallel configuration as regards an actuating drive.

FIG. 2 shows an actuating apparatus 1' differing from the embodiment according to FIG. 1, in which two shifter drums 3', 4' are arranged in parallel with respect to a single actuating drive 5', a respective kinematic coupling 14 and 15 being provided between shifter drums 3', 4' and actuating drive 5'. A shorter overall length for the entire arrangement can be achieved with an embodiment as shown in FIG. 2, shifter drums 3', 4', which then lie next to one another, being once again kinematically coupled to one another.

| List of reference characters | |
|---|---|
| 1, 1' | Actuating apparatus |
| 2 | Gear-shifting transmission, 4 × 2 multiple-group transmission |
| 3, 3' | Shifter drum |
| 4, 4' | Shifter drum |
| 5, 5' | Actuating drive |
| 6 | Guide element, shift fork |
| 7 | Guide element, shift fork |
| 8 | Guide element, shift fork |
| 9 | Guide, circumferential track |
| 10 | Guide, circumferential track |
| 11 | Guide, circumferential track |
| 12 | Conversion ratio system, planetary transmission |
| 13 | Shaft |
| 14 | Kinematic coupling |
| 15 | Kinematic coupling |

What is claimed is:

1. An actuating apparatus for an automated multiple-ratio transmission (2) of a motor vehicle comprising:

a first shifter drum (3; 3'), actuatable by an actuating drive (5; 5');

at least one guide (9, 10) on the first shifter drum in which at least one guide element (6, 7) joined to an actuating member of the multiple-ratio transmission (2), is guided;

a second separate shifter drum (4; 4') is kinematically coupled to the first shifter drum via a constant conversion ratio system (12);

wherein the first shifter drum is connected to an input gear of the constant conversion ratio system (12) and the second shifter drum is connected to an output gear of the constant conversion ratio system (12).

2. The actuating apparatus according to claim 1, wherein the shifter drums (3, 4; 3', 4') are driven by a single actuating drive (5; 5').

3. The actuating apparatus according to claim 1, wherein the guide (9, 10, 11) is configured as a circumferential track.

4. The actuating apparatus according to claim 1, wherein the guide element (6, 7, 8) represents a shift fork.

5. The actuating apparatus according to claim 1, wherein one of the first and second shifter drum (3, 4; 3', 4') is associated with each transmission group of a multiple-group transmission (2).

6. The actuating apparatus according to claim 1, wherein one of the first and second shifter drum is associated with each transmission section (even/odd ratios) of a double-dutch transmission.

7. An actuating apparatus for an automated multiple-ratio transmission (2) of a motor vehicle comprising:

a first shifter drum (3; 3'), actuatable by an actuating drive (5; 5');

at least one guide (9, 10) on the first shifter drum in which at least one guide element (6, 7) joined to an actuating member of the multiple-ratio transmission (2), is guided;

a second shifter drum actuatable by the actuating drive (5; 5'), and the first and second shifter drums are connected in parallel with the actuating drive; and wherein a respective first and second kinematic gear coupling is provided between each said first and second shifter drum and the actuating drive, and the first drum is connected to an output of said first kinematic gear coupling and the second drum is connected to an output of said second kinematic gear coupling.

8. The actuating apparatus according to claim 7, wherein the shifter drums (3, 4; 3', 4') are driven by a single actuating drive (5; 5').

9. The actuating apparatus according to claim 7, wherein the shifter drums (3, 4; 3', 4') are connected to an actuating drive (5; 5') via one of a constant and non-constant conversion ratio system (13; 14, 15).

10. The actuating apparatus according to claim 7, wherein the shifter drums (3, 4; 3', 4') are coupled to one another via a constant conversion ratio system (12).

11. The actuating apparatus according to claim 7, wherein the shifter drums (3, 4; 3', 4') are coupled to one another via a conversion ratio system that varies with rotation of the drums.

12. The actuating apparatus according to claim 11, wherein the conversion ratio is infinitely variable within a defined range.

13. The actuating apparatus according to claim 7, wherein the guide (9, 10, 11) is configured as a circumferential track.

14. The actuating apparatus according to claim 7, wherein the guide element (6, 7, 8) represents a shift fork.

15. The actuating apparatus according to claim 7, wherein one shifter drum (3, 4; 3', 4') is associated with each transmission group of a multiple-group transmission (2).

16. The actuating apparatus according to claim 7, wherein one shifter drum is associated with each transmission section (even/odd ratios) of a double-clutch transmission.

17. An actuating apparatus for an automated multiple-ratio transmission (2) of a motor vehicle comprising:

a first shifter drum (3; 3'), actuatable by an actuating drive (5; 5');

at least one guide (9, 10) on the first shifter drum in which at least one guide element (6, 7) joined to an actuating member of the multiple-ratio transmission (2), is guided;

a second separate shifter drum (4; 4') is kinematically coupled to the first shifter drum via a geared constant conversion ratio system (12);

wherein the first shifter drum is connected to an input gear of the constant conversion ratio system (12) and the second shifter drum is connected to an output gear of the constant conversion ratio system (12).

18. The actuating apparatus according to claim 17, wherein the shifter drums (3, 4; 3', 4') are driven by a single actuating drive (5; 5').

19. The actuating apparatus according to claim 17, wherein the guide (9, 10, 11) is configured as a circumferential track.

20. The actuating apparatus according to claim 17, wherein the guide element (6, 7, 8) represents a shift fork.

* * * * *